US011841279B2

(12) United States Patent
Russell et al.

(10) Patent No.: US 11,841,279 B2
(45) Date of Patent: Dec. 12, 2023

(54) ISOTHERMAL CALORIMETER

(71) Applicant: TA Instruments-Waters LLC, New Castle, DE (US)

(72) Inventors: Donald J. Russell, Orem, UT (US); David Serrell, Draper, UT (US)

(73) Assignee: TA Instruments-Waters LLC, New Castle, DE (US)

(*) Notice: Subject to any disclaimer, the term of this patent is extended or adjusted under 35 U.S.C. 154(b) by 412 days.

(21) Appl. No.: 17/089,077

(22) Filed: Nov. 4, 2020

(65) Prior Publication Data

US 2021/0156750 A1     May 27, 2021

Related U.S. Application Data

(60) Provisional application No. 62/938,382, filed on Nov. 21, 2019.

(51) Int. Cl.
*G01K 17/04* (2006.01)
*G01N 25/30* (2006.01)

(52) U.S. Cl.
CPC .............. *G01K 17/04* (2013.01); *G01N 25/30* (2013.01)

(58) Field of Classification Search
CPC ........ G01K 17/04; G01K 17/00; G01K 18/08; G01N 25/30; G01N 25/20
(Continued)

(56) References Cited

U.S. PATENT DOCUMENTS

| 4,255,961 A | 3/1981 | Biltonen et al. |
| 2008/0080586 A1* | 4/2008 | Huetter .............. G01N 25/4866 374/E7.004 |

(Continued)

FOREIGN PATENT DOCUMENTS

| CN | 112912721 A | * 6/2021 | ............. G01K 17/00 |
| DE | 102007059344 A1 | * 6/2008 | ............. G01N 25/20 |

(Continued)

OTHER PUBLICATIONS

International Search Report and Written Opinion in PCT/US2020/058824 dated Feb. 24, 2021.
International Preliminary Report on Patentability in PCT/US2020/058824 dated Jun. 2, 2022.
"Microcalorimetry," brochure, TA Instruments, 2012, New Castle, Deleware.

(Continued)

*Primary Examiner* — Gail Kaplan Verbitsky
(74) *Attorney, Agent, or Firm* — Schmeiser, Olsen & Watts LLP; William G. Guerin

(57) ABSTRACT

Described is a calorimeter that includes a thermal column, a sample container, a reference container, a thermal shield, a diffusion-bonded block and a thermal plate. One or more heat flux sensors are disposed between the thermal column and the sample container and between the thermal column and the reference container. The thermal shield is in thermal communication with the thermal column and is separated from and substantially encloses the sample container, reference container and thermal column. The diffusion-bonded block includes a first metallic layer having a first thermal conductivity, a second metallic layer having a second thermal conductivity and a third metallic layer having a third thermal conductivity. The second thermal conductivity is different from the first and third thermal conductivities. The first metallic layer is in thermal communication with the base of the thermal column and the third metallic layer is in thermal communication with the thermal plate.

18 Claims, 9 Drawing Sheets

(58) Field of Classification Search
USPC .............................. 436/147; 422/51; 374/33
See application file for complete search history.

(56) References Cited

U.S. PATENT DOCUMENTS

| | | | |
|---|---|---|---|
| 2008/0151962 A1* | 6/2008 | Teramoto | G01N 25/20 374/E17.008 |
| 2014/0092935 A1 | 4/2014 | Lin et al. | |
| 2017/0227480 A1 | 8/2017 | Russell et al. | |
| 2018/0108593 A1 | 4/2018 | Terasaki et al. | |

FOREIGN PATENT DOCUMENTS

| | | | | |
|---|---|---|---|---|
| FR | 3028948 A1 * | 5/2016 | ............. | G01K 17/04 |
| GB | 2547113 A * | 8/2017 | ............. | G01N 25/20 |
| WO | 2008024455 A2 | 2/2008 | | |
| WO | 2012103601 A1 | 8/2012 | | |
| WO | 2014153438 A1 | 9/2014 | | |

OTHER PUBLICATIONS

Combined Search and Examination Report in UK Patent Application No. GB1701696.5, dated May 30, 2017.
Examination Report in UK Patent Application No. GB1701696.5, dated Dec. 14, 2017.
Examination Report in UK Patent Application No. GB1701696.5, dated Feb. 19, 2018.
Examination Report in U.K. Patent Application No. GB1701696.5 dated Aug. 31, 2018.
Examination Report in U.K. Patent Application No. GB1701696.5 dated Jun. 27, 2018.
Non-Final Office Action in U.S. Appl. No. 15/423,738 dated Nov. 5, 2018.
Final Office Action in U.S. Appl. No. 15/423,738 dated May 31, 2019.
Notice of Allowance in U.S. Appl. No. 15/423,738 dated Jul. 31, 2019.

* cited by examiner

ISOTHERMAL CALORIMETER

RELATED APPLICATION

This application claims the benefit of the earlier filing date of U.S. Provisional Patent Application Ser. No. 62/938,382, filed Nov. 21, 2019 and titled "Isothermal calorimeter," the entirety of which is incorporated herein by reference.

FIELD OF THE INVENTION

The technology generally relates to calorimeters. More particularly, the technology relates to a calorimeter having reduced equilibrium time without sacrificing measurement sensitivity. The calorimeter may be used for thermal testing of batteries.

BACKGROUND

Calorimeters are instruments that may be used to measure changes in the energy of a sample by measuring the heat flow between the sample and its surroundings. The present embodiments relate generally to calorimeters that may be used to characterize an event that produces or absorbs thermal energy. For example, such events may be associated with batteries and similar components used to power wireless cell phones and other portable devices.

For example, an isothermal calorimeter for testing a battery may be placed in a thermostat having a circulating oil bath to achieve a uniform and precise temperature environment. Generally, the internal components of the calorimeter are thermally-isolated from the calorimeter housing and thermal environment outside the housing therefore significant time may be required for the calorimeter to reach equilibrium. For example, several hours or more may be required after loading the calorimeter with the sample to be tested until the start of thermal measurements. In addition, conventional calorimeters that may be employed for battery testing are subject to thermal noise present within the calorimeter which can degrade the thermal measurements.

SUMMARY

In one example, a calorimeter includes a thermal column, a sample container, a reference container, a thermal shield, a diffusion-bonded block and a thermal plate. The thermal column has a first side, a second side and a base. At least one heat flux sensor is disposed on the first side between the thermal column and the sample container and at least one heat flux sensor is disposed on the second side between the thermal column and the reference container. The sample container is configured to receive a sample to be tested. The thermal shield is in thermal communication with the thermal column and is separated from and substantially encloses the sample container, reference container and thermal column. The diffusion-bonded block includes a first metallic layer having a first thermal conductivity, a second metallic layer having a second thermal conductivity and a third metallic layer having a third thermal conductivity. The second metallic layer is between the first metallic layer and the third metallic layer. The second thermal conductivity is different from the first thermal conductivity and the third thermal conductivity. The first metallic layer is in thermal communication with the base of the thermal column. The thermal plate is in thermal communication with the third metallic layer of the diffusion-bonded block.

The calorimeter may include an insulation enclosure substantially surrounding the thermal shield.

The diffusion-bonded block may include more than three metallic layers. At least one of the first, second and third metallic layers may be a copper layer. At least one of the first, second and third metallic layers may be a copper layer or a stainless steel layer.

At least one heat flux sensor on each of the first and second sides may be a Peltier module.

The thermal column may be an aluminum bloc. The thermal plate may be an aluminum plate. The thermal shield may be formed of copper.

The calorimeter may further include at least one calibration heater disposed in a side of each of the sample container and the reference container. Each of the sample container and the reference container may include a plurality of tabs with the calorimeter further including a plurality of springs each coupled at one end to one of the tabs of the sample container and at an opposite end to one of the tabs of the reference container.

In another example, an apparatus for calorimetric measurements of a battery includes a thermal column, a sample container, a reference container, a diffusion-bonded block and a thermal plate. The thermal column has a first side, a second side and a base. At least one heat flux sensor is disposed on the first side between the thermal column and the sample container and at least one heat flux sensor disposed on the second side between the thermal column and the reference container. The sample container is configured to receive a battery to be tested. The diffusion-bonded block includes a first metallic layer having a first thermal conductivity, a second metallic layer having a second thermal conductivity and a third metallic layer having a third thermal conductivity. The second metallic layer is between the first metallic layer and the third metallic layer. The second thermal conductivity is different from the first thermal conductivity and the third thermal conductivity. The first metallic layer is in thermal communication with the base of the thermal column. The thermal plate is in thermal communication with the third metallic layer of the diffusion-bonded block.

The apparatus may include a thermal shield in thermal communication with the thermal column wherein the thermal shield is separated from and substantially encloses the sample container, reference container and thermal column. The apparatus may further include an insulation enclosure substantially surrounding the thermal shield.

At least one heat flux sensor on each of the first and second sides may be at least one Peltier module.

The diffusion-bonded block may include more than three metallic layers.

The calorimeter may further include at least one calibration heater disposed in a side of each of the sample container and the reference container. The sample container and the reference container may each include a plurality of tabs and the calorimeter may include a plurality of springs each coupled at one end to one of the tabs of the sample container and at an opposite end to one of the tabs of the reference container.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. In the figures, like reference numerals designate corresponding parts throughout the different views.

DETAILED DESCRIPTION

Figure 1A:
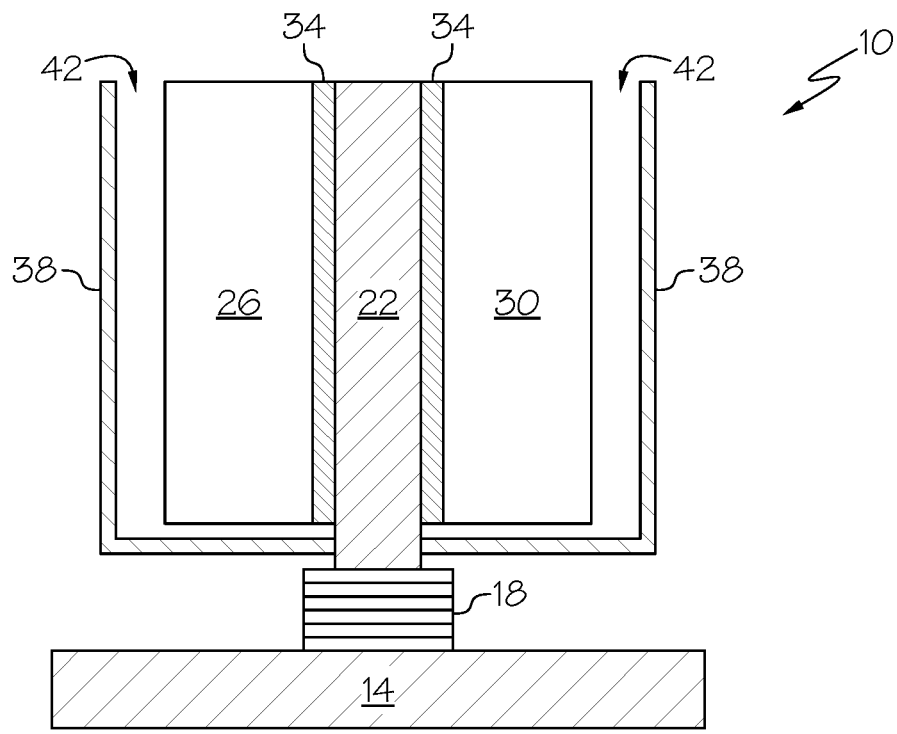
FIGS. 1A and 1B are schematic depictions of a side view and a top view, respectively, of a calorimeter.

Batteries such as those used for wireless phones and portable electronic devices require testing to determine various battery characteristics. For example, an isothermal calorimeter may be used to determine the discharge characteristics and energy efficiency of a battery. Calorimeters may also be employed for use in quality control and quality assurance in battery production facilities. In addition, calorimeters may be configured and used to characterize events of other components and devices that produce or absorb thermal energy.

Examples of calorimeters described below have at least one metal plate or block that, instead of being machined from a single metal, have multiple metallic layers that are diffusion-bonded together to produce a metallic block with the unique property of having a higher thermal conductivity laterally across the block than through the block. The multiple metallic layers may, for example, have layers of a highly conductive metal (such as copper, silver, gold or aluminum) alternating with layers of a less conductive metal (such as stainless steel, Inconel, bronze, or titanium). In addition, the examples of calorimeters include a thermal shield that is thermally coupled to a thermal column that is also thermally coupled through heat flux sensors to sample and reference containers.

Examples of the diffusion-bonded block may have a first layer of copper, a second layer of stainless steel, a third layer of copper, a fourth layer of stainless steel and a fifth layer of copper. Other examples may include three layers of copper, stainless steel, and copper; seven layers of copper, stainless steel, copper, stainless steel, copper, steel and copper; or nine layers of copper, stainless steel, copper, stainless steel, copper, stainless steel, copper, steel and copper. Yet other examples may have sequential layers of silver, stainless steel, silver, stainless steel and silver; or copper, stainless steel, silver, stainless steel and copper, for example. Other examples include aluminum or gold layers instead of copper layers, or Inconel, bronze or titanium layers instead of the stainless steel layers.

Heat flow in the vertical direction (perpendicular to the layer surfaces) is inhibited relative to heat flow in the horizontal direction (parallel to the layer surfaces). Thus, any spatial noise or spatial thermal gradient present in the layer at one end of the diffusion-bonded block is substantially reduced or eliminated from the layer at the opposite end of the block. The inhibited heat flow through the layers inhibits thermal noise generated by outside sources from reaching and mixing with the thermal signal generated in the calorimeter. This occurs, in part, because thermal noise that is generated by sources external to the calorimeter may have a higher frequency than the calorimeter signal that is being detected. The diffusion-bonded block may act as a low-pass filter, inhibiting the flow of heat from higher frequency sources, and thus reducing the noise in the thermal signals at the heat flux sensors.

Figure 1B:
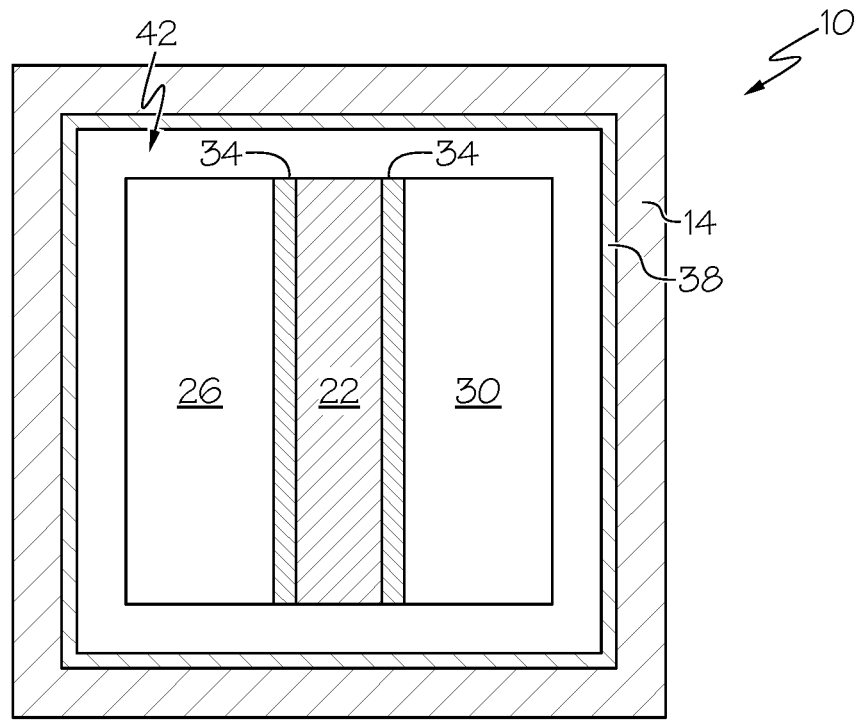

FIGS. 1A and 1B are highly-schematic depictions of a side view and a top view, respectively, of a calorimeter 10 for testing of large samples such as electronic devices and power sources for such devices. Examples of items that may be tested include batteries such as those used in wireless phones and personal hand-held devices. The calorimeter 10 includes a thermally-conductive plate 14 on top of which is mounted a diffusion-bonded block 18. The thermal plate 14 may be formed of solid aluminum or other highly thermally-conductive metal. A thermal column 22 extends vertically from its base at a side of the diffusion-bonded block 18 that is opposite to the side in contact with the thermal plate 14. The thermal column 22 has a rectangular cross-section and includes a solid block of aluminum although in other examples the column 22 may be made from a different metal and the cross-section may be different. A sample container 26 is held against one or more heat flux sensors (e.g., Peltier modules) 34 disposed on one side of the thermal column 22. Similarly, a reference container 30 is held against one or more heat flux sensors 34 disposed on the opposite side of the column 22. The sample container 26 is configured to receive and hold a battery to be tested. The difference between the signal generated by the heat flux sensors 34 on the sample side and the signal generated by the heat flux sensors 34 on the reference side is measured and used to determine the heat flow caused by the sample. This differencing of signals substantially prevents thermal noise common to both containers 26 and 30 from degrading the thermal measurement.

A thermal shield 38 substantially encloses the thermal column 22, heat flux sensors 34 and containers 26, 30. Substantial enclosure in this example means that at least the outward facing sides of these internal components are surrounded by the thermal shield 38 with a small gap 42 in between. The thermal shield 38 is preferably formed of a high thermal conductivity metal such as copper. The thermal shield 38 is secured to and in thermal communication with the thermal column 22 without being in contact with any other structures.

Figure 2:
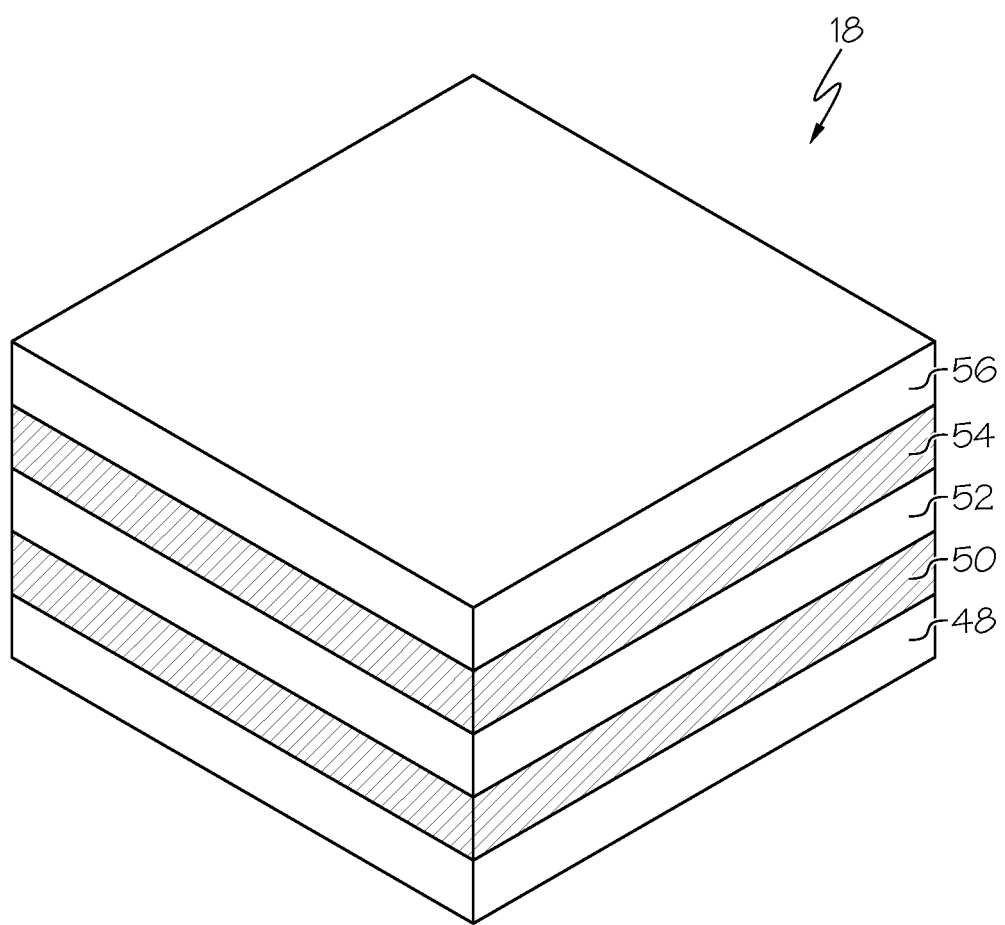
FIG. 2 is an illustration of an example of the diffusion-bonded block shown in FIGS. 1A and 1B.

FIG. 2 is an illustration of an example of the diffusion-bonded block 18 shown in FIGS. 1A and 1B. The diffusion-bonded block 18 has a higher thermal conductivity laterally across the block than through the layers of the block. Thus, a lateral spatial variation in temperature across one external layer of the block 18 does not result in any significant lateral spatial variation in temperature at the opposite external layer of the block 18.

In the illustrated example, the diffusion-bonded block 18 has five metallic layers: a first copper layer 48, a first stainless steel layer 50, a second copper layer 52, a second stainless steel layer 54 and a third copper layer 56. Stainless steel layers 50 and 54 may be, for example, approximately 0.025 to 0.050 inches thick and copper layers 48, 52 and 56 may be, for example, approximately 0.050 to 0.080 inches thick, although other thicknesses may be used. In other implementations the number of layers and/or the layer materials may be different. U.S. Patent Publication No. 2017/0227480 A1, incorporated herein by reference in its entirety, discloses various diffusion-bonded blocks that may be suitable for use according to different implementations of calorimeters described herein.

Figure 3A:
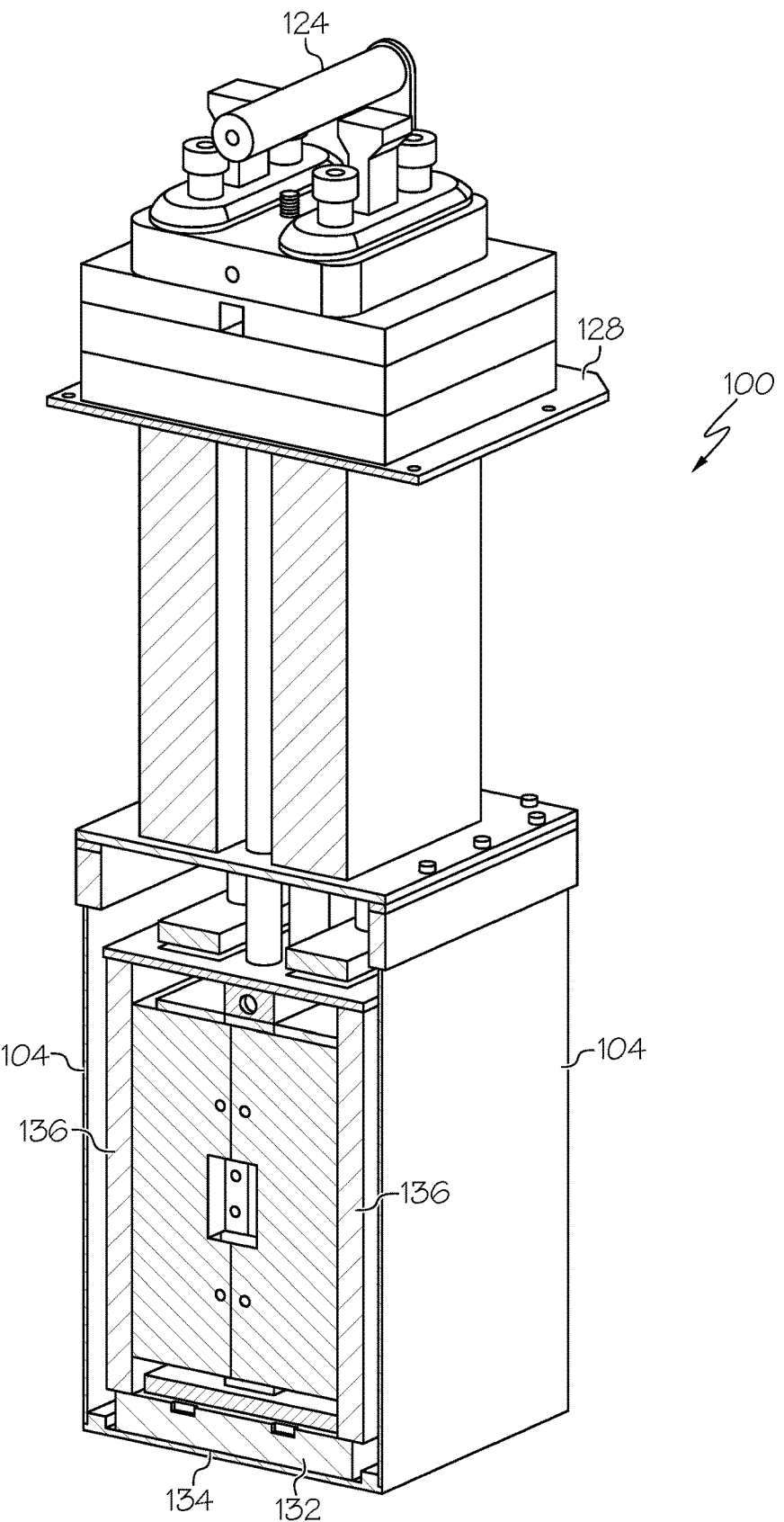
FIG. 3A is a perspective view of an example of an isothermal calorimeter and FIG. 3B shows the isothermal calorimeter with a portion of the housing removed to enable viewing of the internal structure.
Figure 3B:
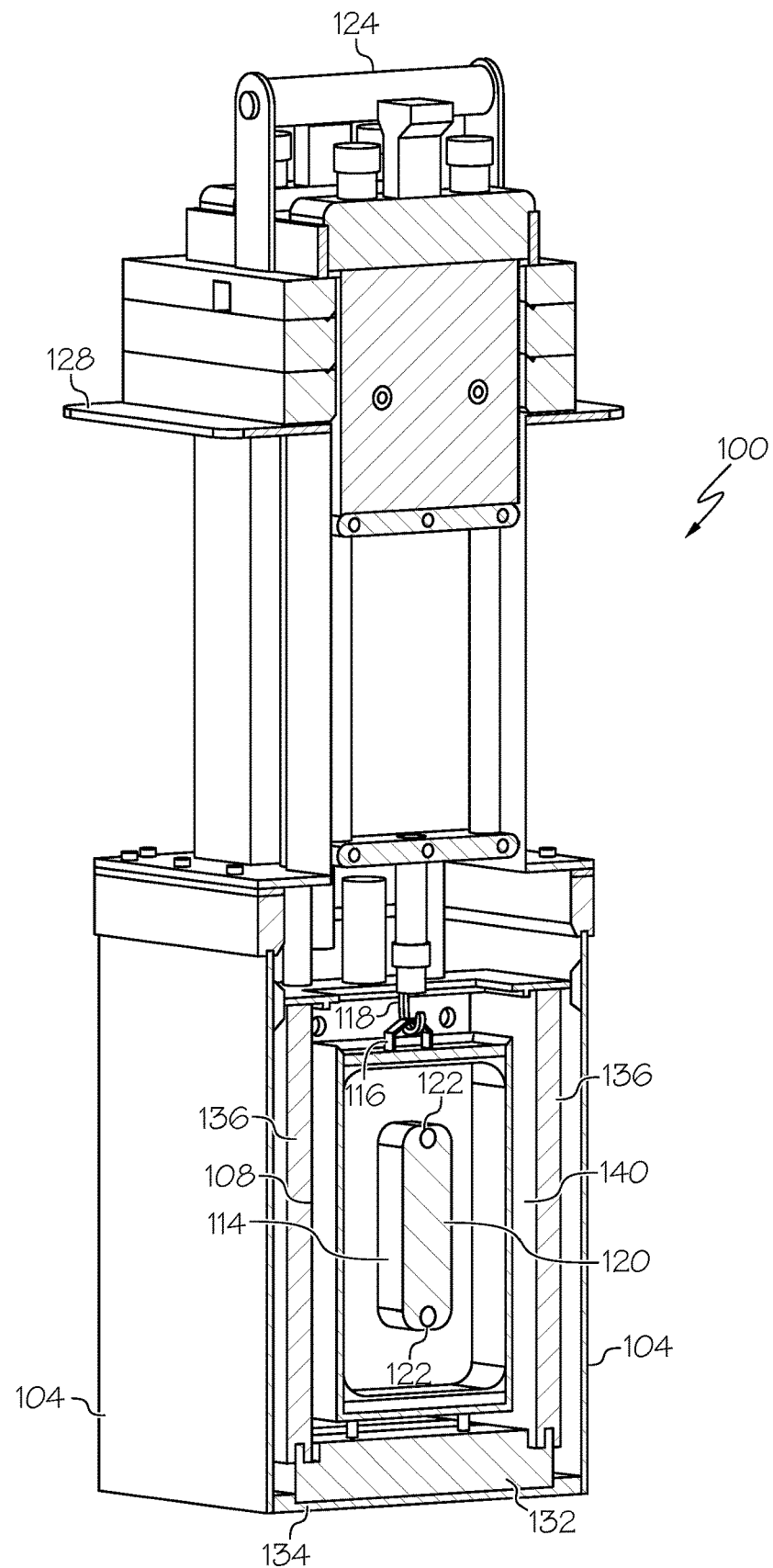

Referring to FIG. 3A, a perspective view of a more detailed example of an isothermal calorimeter 100 according to principles described herein is shown. The calorimeter 100 includes a housing, or cannister, 104 that defines a chamber to receive a sample container having a battery or other component to be evaluated. In one implementation the housing 104 is formed of stainless steel. Referring also to FIG. 3B, a portion of the housing 104 is not shown to enable viewing of the internal structure of the calorimeter 100.

During measurements the chamber is occupied, in part, by a sample container 108 and reference container 112 (not visible, on opposite side) each of which is coupled by a loop 116 at the top that engages a hook 118 used to lower the sample and reference containers 108, 112 into the chamber and to pull the sample and reference containers 108, 112 upward for removal from the chamber. The hook 118 is mechanically coupled to a lifter mechanism used to lower and raise the containers 108, 112. Once a container 108, 112 is lowered into the measurement position such that it is in contact with support posts 152 at the bottom, an additional small motion of the hook 118 in a downward direction results in disengagement of the hook 118 from the loop 116. Thus, there is a separation between the hook 118 and loop 116 that avoids a thermal path that may otherwise degrade measurement accuracy. As illustrated, the sample container 108 includes a raised inner wall 114 within which a single cell cylindrical battery such as an AA battery may be inserted for testing. A cover plate 120 is attached using two screws 122 after the battery is inserted. In other examples, the sample container may be configured differently to receive other types of batteries or electrical power source devices that have different shapes and volumes as long as the battery fits within the outer shell of the sample container. For example, the sample container may be configured to receive a battery suitable for providing electrical power for a wireless phone.

The sample container 108 is preferably fabricated from a solid block of metal such as a block of aluminum. With the sample container 108 being fabricated from a solid block of metal, good thermal conductivity is achieved between the battery and the sample container 108, and between the sample container 108 and the heat flux sensors on the side of the thermal column (not visible). For example, the block of metal may be machined to remove most of the metal material while leaving features to accommodate mounting of the battery. In an alternative process, the sample container may be fabricated using individual thin metal plates bolted or otherwise secured to each other; however, the resulting sample container may exhibit a substantially poorer thermal coupling to the inner structure. Preferably, the sample and reference containers 108,112 have a low mass to avoid addition of a large thermal time constant from the added heat capacity.

The calorimeter 100 includes a handle 124 that may be used to lower the calorimeter 100 into a thermostat (not shown) and to remove the calorimeter 100 from the thermostat. A top plate 128 mounts to an upper plate of the thermostat. When fully inserted, the top surface of a temperature-controlled oil bath contained within the thermostat is just below the top plate 128 of the calorimeter 100 and the oil is in contact with the outer surfaces of the calorimeter housing 104.

In conventional calorimeters, a structure to which the sample and reference chambers are mounted is suspended within the housing of the calorimeter. The thermal signal to noise is improved because the thermal coupling to the oil bath is indirect such that thermal transient noise in the oil bath is effectively low-pass filtered; however, the time constant for the structure holding the sample and reference chambers is increased. In the illustrated example as well as in other examples of calorimeters according to the principles described herein, a thermal plate 132 formed of aluminum (or other metal) rests directly on the bottom plate 134 of the stainless steel housing 104 to achieve a high thermal conductivity coupling. Thus, unlike conventional calorimeters, the structure to which the sample and references containers 108, 112 are coupled is better thermally coupled to the oil bath. Thus, the calorimeter 100 generally equilibrates faster after a sample is inserted and preparations for measurement are completed. Similarly, if the thermostat is changed to a different operating temperature, the time for the calorimeter 100 to reach equilibrium at the new operating temperature is substantially reduced.

Thermal isolation is provided by a thermal insulation enclosure 136 which completely surrounds four sides around the inner structure, that is, substantially encloses the containers 108, 112, heat flux sensors and thermal column. In one example, the insulation is ELFOAN® P600 polyisocyanurate foam available from Elliot Company of Indianapolis, In. The insulation 136 substantially eliminates any lateral thermal paths to the inner structure. A thermal shield 140 is thermally coupled to a thermal column (described below) of the calorimeter 100 and is disposed inside the walls of thermal insulation 136. A small gap exists between the thermal shield 140 and the insulation 136 and a larger gap is present between the thermal shield 140 and the sample and reference containers 108, 112. Preferably, the thermal shield 140 is formed of a thin layer of copper or other high thermal conductivity metal. The thermal shield 140 ensures that the thermal environment that surrounds the sample and reference containers 108, 112 is substantially the same as that of the thermal column (not visible) disposed between the containers. Advantageously, the thermal shield 140 prevents a problem that can otherwise occur if only thermal insulation is used for thermal isolation. More specifically, the thermal insulation 136 has a long thermal time constant such that heat generated inside the sample container 108 and passing into the insulation can later leak back into the sample container 108 if there were no intervening thermal shield, thereby causing drift in the thermal measurement baseline.

Figure 4:
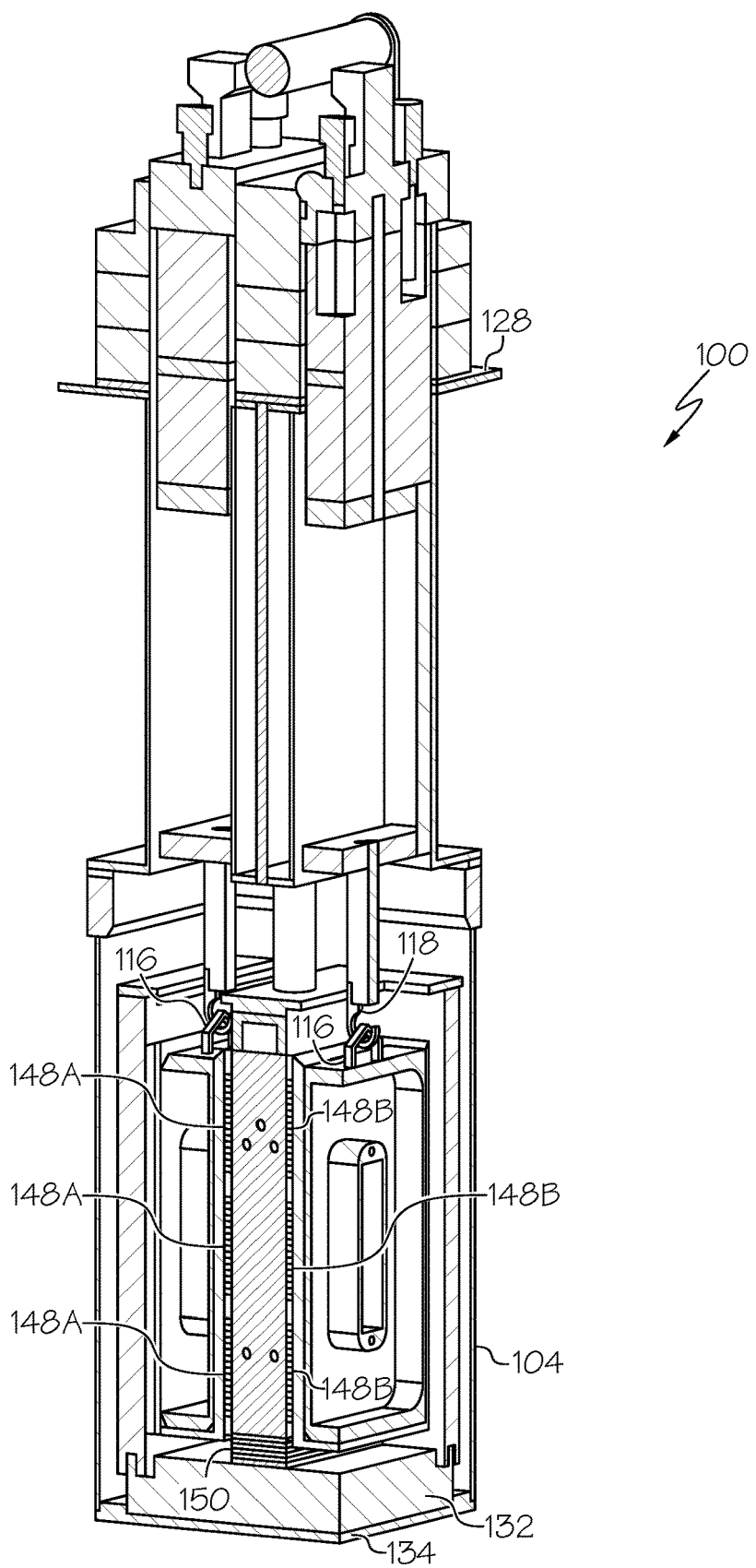
FIG. 4 shows a perspective view of the calorimeter of FIGS. 3A and 3B with a portion of the thermal insulation and thermal shield removed to enable a view of the thermal column and other internal features.
Figure 5:
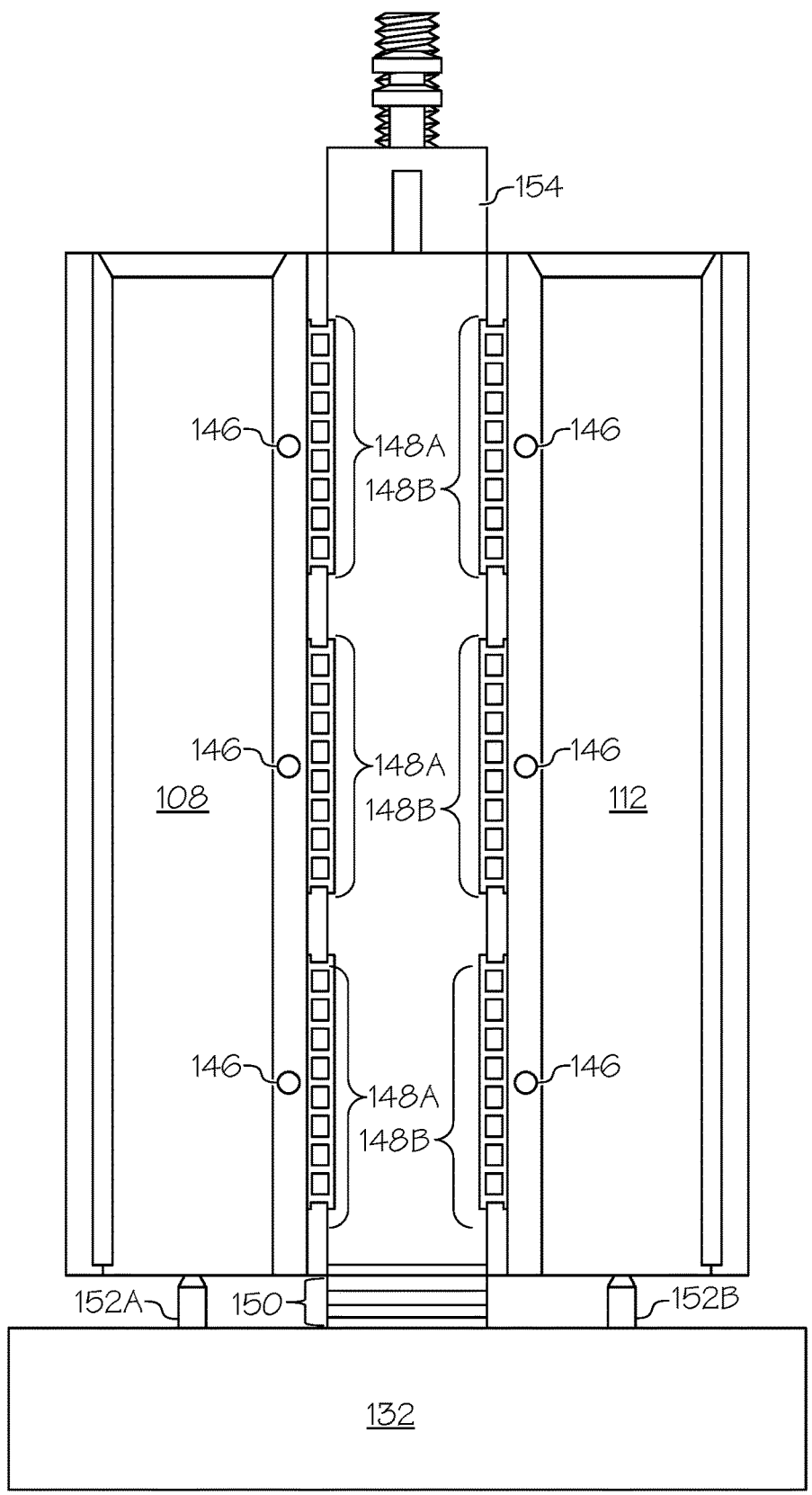
FIG. 5 is a cutaway view of the calorimeter at a plane midway between the sample and reference containers.

Reference is now made to FIGS. 4 and 5. FIG. 4 shows a perspective view of the calorimeter 100 with a portion of the thermal insulation 136 and thermal shield 140 removed to permit a view of the thermal column 144 and other internal features. FIG. 5 is a cutaway view of the calorimeter 100 (with the housing 104 removed) at a plane midway between the sample and reference containers 108, 112.

The thermal column 144 may be formed of aluminum, copper or other metal. Heat flux sensors 148 in the form of Peltier modules are provided on both sides of the column 144. One side of the column 144 includes six Peltier modules 148A arranged in a three row by two column arrangement to measure the heat flow between the block 144 and the sample container 108. The other side of the column 144 includes six similarly arranged Peltier modules 148B used to measure the heat flow between the column 144 and the reference container 112. The Peltier modules 148 may be electrically connected such that a single measurement based the signals generated by all six modules on a side is used to determine the heat flow to or from the column 144 for the corresponding container 108 or 112. Calibration heaters 146 are provided in the side of each container 108, 112 proximate to each Peltier module 148 to enable a calibration process for the modules to be performed. Alternatively, a calibration heater having a similar form factor to a battery to be tested can be inserted into the sample container 108 or reference container 112 to perform a calibration of the Peltier modules 148.

Electrical conductors used to conduct the electrical signals generated by the Peltier modules 148 enter and exit the calorimeter 100 though the top and are thermally coupled to the thermal column 144. This prevents heat generated in the sample container 108 from flowing through the electrical conductors. For example, the wires from each Peltier module 148 may be secured via a thermally conductive adhesive (e.g., Kapton® tape) to the column 144. In contrast, the wires to the calibration heaters are not heat-sinked to the column 144 and are instead thermally coupled to the sample container 108 or reference container 112 to permit the heat generated by the calibration heaters to flow from the containers to the thermal column 144.

A thermal pathway for heat generated within the calorimeter 100 is provided from the sample and reference containers 108, 112 through the respective Peltier modules 148, thermal column 144, diffusion-bonded block 150, thermal plate 132 and through the bottom plate 134 to the oil bath. A block 154 of low thermal conductivity material (e.g., polyether ether ketone (PEEK)) is attached to the top of the thermal column 144 to prevent a significant thermal pathway from being established with the structure above the containers 108, 112.

The diffusion-bonded block 150 includes alternating layers of materials of different thermal conductivity, as described above. For example, the external (top and bottom) layers of the block 150 may be copper with alternating inner layers of stainless steel and copper. Advantageously, any asymmetric application of thermal energy to the bottom layer of the diffusion-bonded block 150 due to thermal gradients in the thermal plate 132 does not result in an asymmetric application of heat to the thermal column 144 due to the near elimination of thermal gradients across the top layer of the block 150. Moreover, any thermal noise that is coupled in through the thermal plate 132 is substantially cancelled by the differential measurement of the heat flows from (or to) the sample and reference containers 108, 112. Thus, no substantial thermal noise is added to the measurement.

The diffusion-bonded block 150 provides support for the thermal column 144. Two support posts 152 extend upward from the thermal plate 132. One of the posts 152A engages the bottom of the sample container 108 and the other post 152B engages the bottom of the reference container 112. The support posts 152 are preferably made from a low thermal conductivity material (e.g., PEEK). The top portion of each post 152 may be rounded to minimize surface contact with the bottom of each container 108,112 to further restrict the thermal path. The support posts 152 support the weight of the containers 108,112 and prevent the containers from moving downward, for example, when loaded with a sample for testing.

Figure 6:
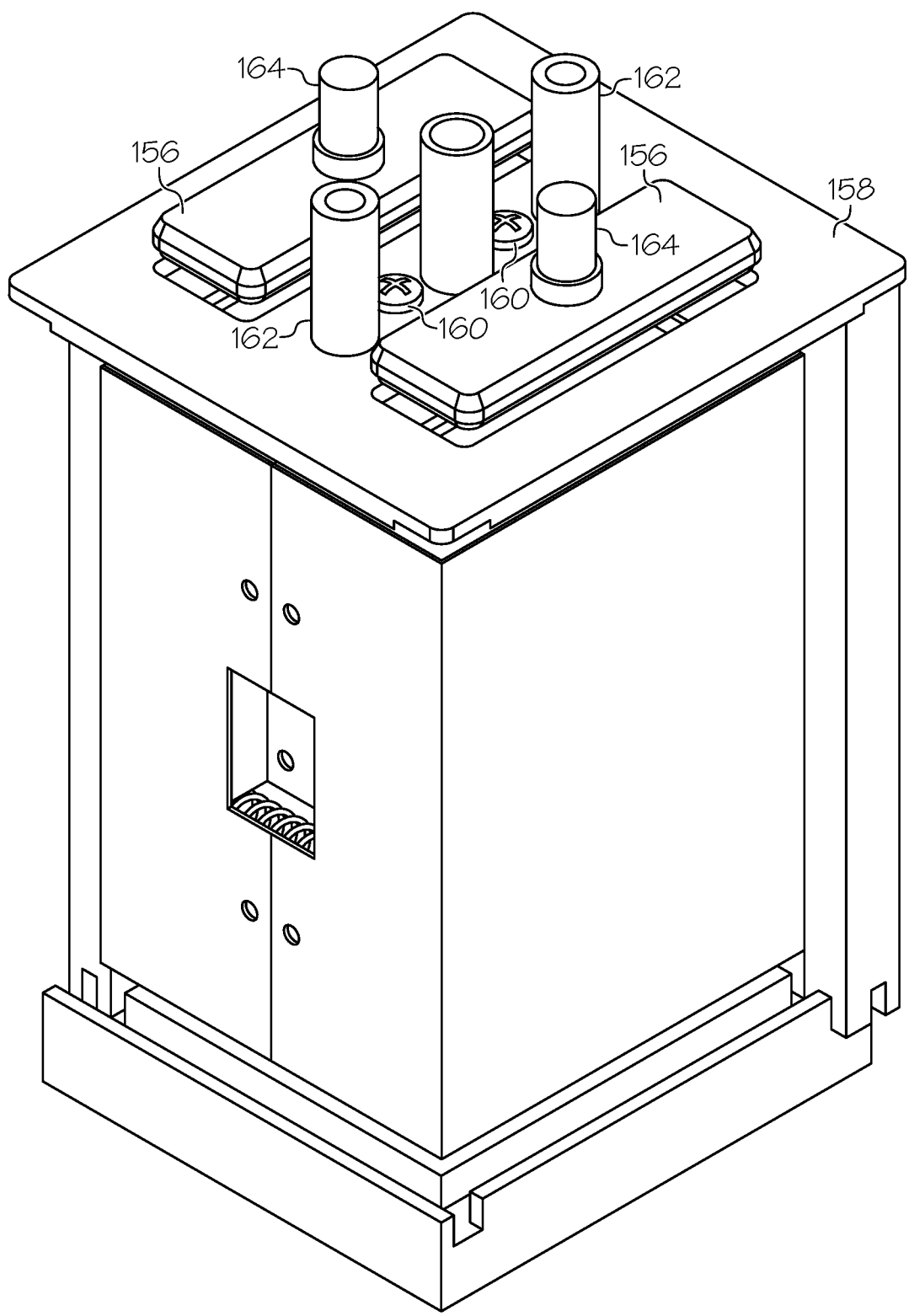
FIG. 6 is a perspective view of the calorimeter with the housing and two of the four sides of thermal insulation removed.

FIG. 6 is a perspective view showing the calorimeter 100 with the housing and two of the four sides of thermal insulation 136 removed. A stainless steel plate 158 covers the top to prevent an air path through to the top of the containers 108,112. An aluminum shunt 156 is provided above each opening in the plate 158. The shunt 156 is thermally conductive to connect into plate 158 to provide an isothermal top layer to the calorimeter 100 and to prevent air flow to the containers 108,112 from above. The shaft 164 for each shunt 156 is made of PEEK.

Figure 7:
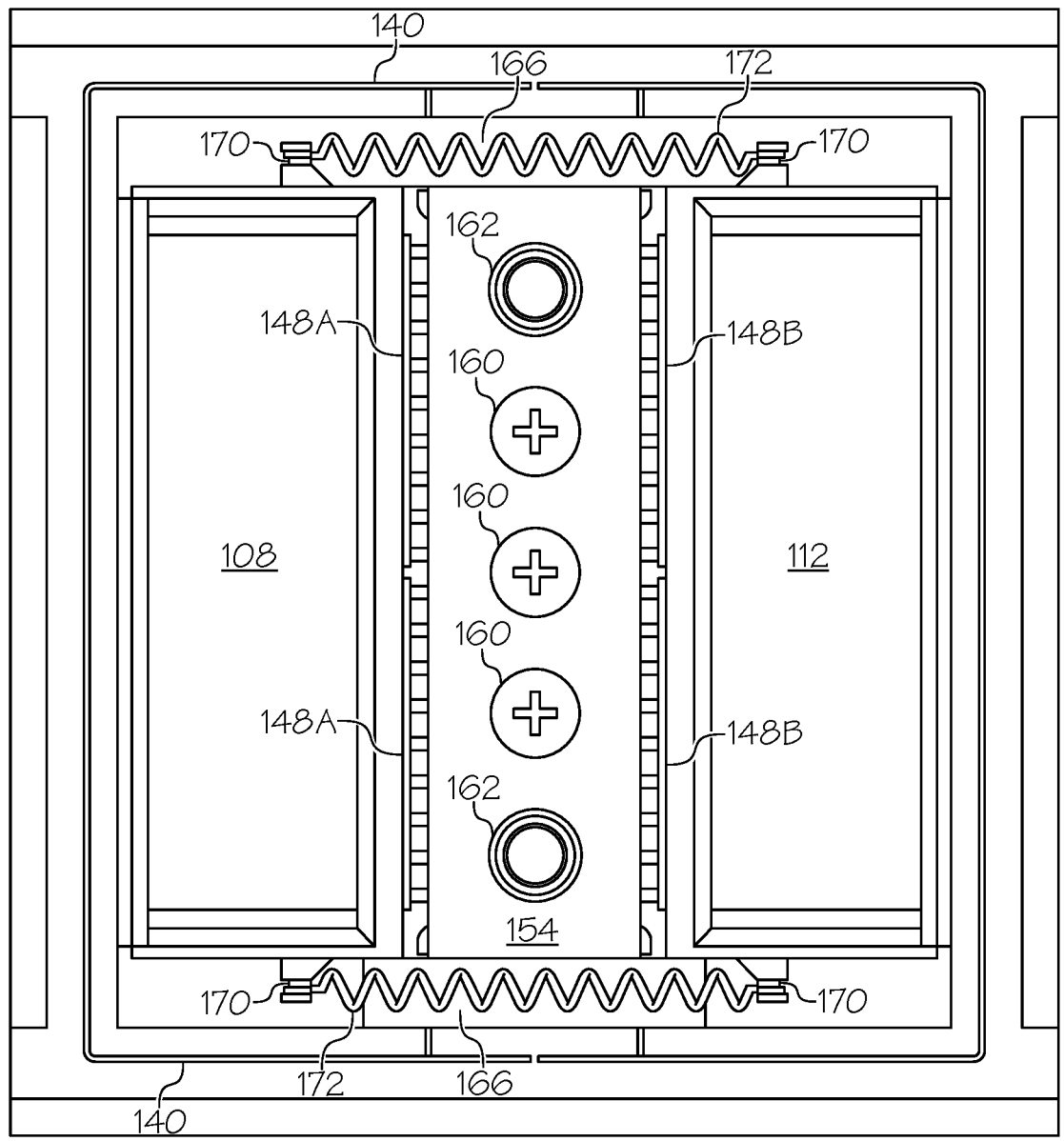
FIG. 7 is a cutaway top view of the calorimeter.

FIG. 7 is a cutaway top view of the calorimeter 100. Three screws 160 are used to secure the low thermal conductivity block 154 to the thermal column 144. The low thermal conductivity block 154 is mechanically coupled to the upper structure through posts/tubes 162. Thus, there is only once direct high thermal conductivity path to the thermal column 144 which is through the thermal plate 132 and diffusion-bonded block 150. Other structural features are constructed to limit alternate thermal pathways to insignificant thermal conductivity.

There are three low thermal conductivity blocks 166 (e.g., PEEK blocks) arranged in vertical separation along one side of the thermal column 144 and another three PEEK blocks 166 on the opposite side of the thermal column 144. These six blocks 166 are secured to the thermal column 144 and act to prevent sideways motion of the sample and reference containers 108,112 (vertical motion in the figure). In addition, each of the containers 108, 112 includes tabs 170 to which one end of a spring 172 is coupled. Thus, the two containers 108, 112 are pulled toward each other by a compressive force exerted by the spring 172. As there are multiple tabs 170 and corresponding springs 172 arranged vertically alongside the thermal column 144, the sample and reference containers 108,112 experience multiple compressive forces that pull them against their corresponding Peltier modules 148. The combination of the spring forces and the motion restriction provided by the side PEEK blocks 166 prevents tilting and sideways motion of the containers 108, 112 and ensures good thermal contact with the Peltier modules 148.

Figure 8:
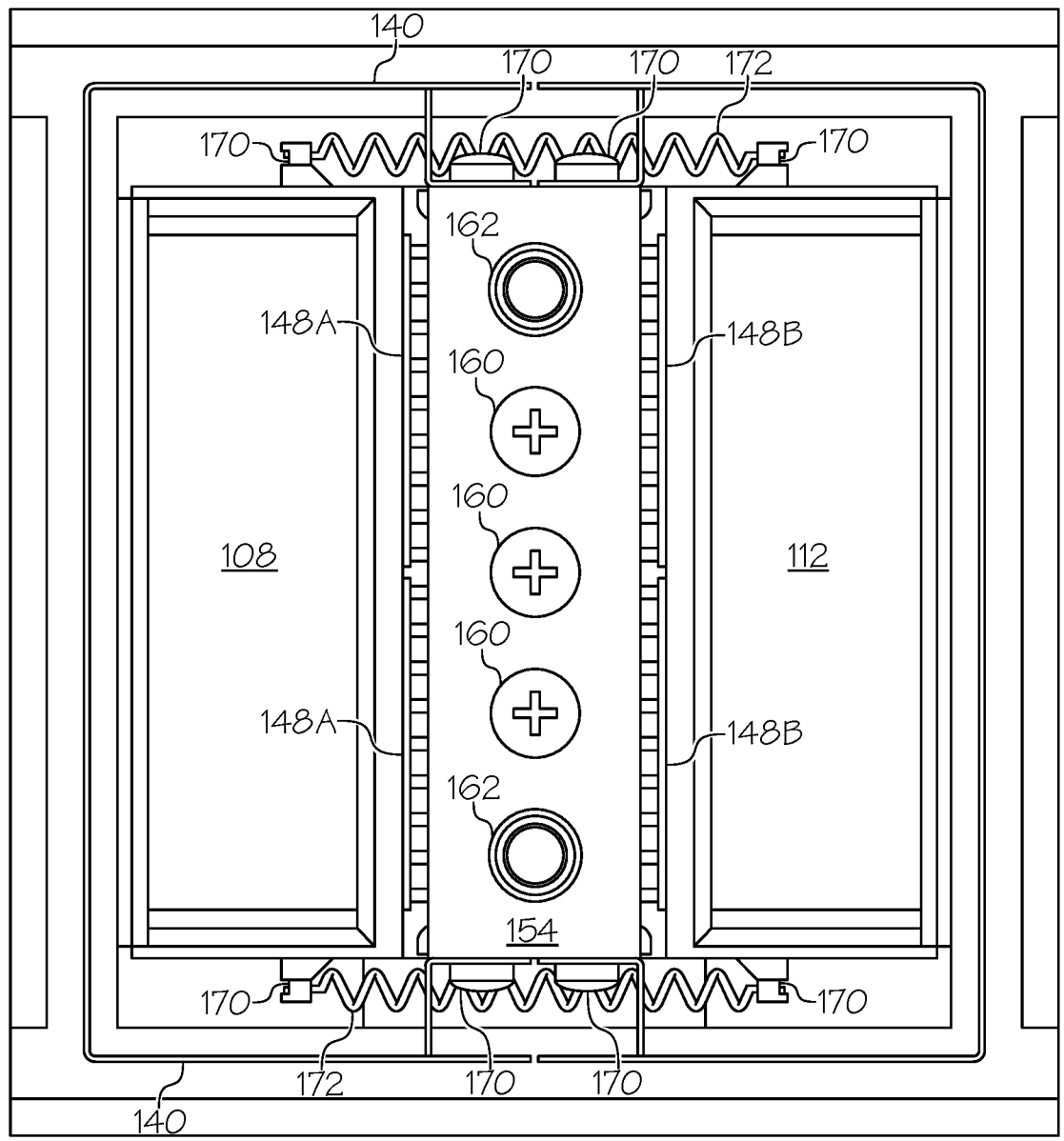
FIG. 8 is another cutaway top view of the calorimeter.

FIG. 8 is another cutaway top view showing how the thermal shield 140 is firmly secured to the thermal column 144 (not directly visible due to obscuration by the PEEK block 154). The thermal shield 140 includes portions that extend inward from the main shield surface. These inward extensions include openings to pass bolts used to secure the shield 140 and provide good thermal contact between the inward extensions and the thermal column 144. A gap exists between each container 108, 112 and the thermal shield 140. The size of the gap is greater at the top and bottom of the figure to avoid the springs 172. Thus, the thermal shield 140 is only in contact with the thermal column 144. In an alternative configuration, the thermal shield 140 can be thermally coupled to and supported by the thermal plate 132; however, such a configuration bypasses the diffusion-bonded block 150 and results in greater thermal noise during the measurement.

While various examples have been shown and described, the description is intended to be exemplary, rather than limiting and it should be understood by those of ordinary skill in the art that various changes in form and detail may be made therein without departing from the scope of the invention as recited in the accompanying claims.

The invention claimed is:
1. A calorimeter comprising:
  a thermal column having a first side, a second side and a base;
  a sample container disposed on the first side and configured to receive a sample to be tested;
  a reference container disposed on the second side;
  a first heat flux sensor disposed on the first side between the thermal column and the sample container;

a second heat flux sensor disposed on the second side between the thermal column and the reference container;

a thermal shield in thermal communication with the thermal column, the thermal shield separated from and substantially enclosing the sample container, reference container and thermal column;

a diffusion-bonded block comprising a first metallic layer having a first thermal conductivity, a second metallic layer having a second thermal conductivity and a third metallic layer having a third thermal conductivity, wherein the second metallic layer is between the first metallic layer and the third metallic layer, the second thermal conductivity being different from the first thermal conductivity and the third thermal conductivity, and the first metallic layer is in thermal communication with the base of the thermal column; and a thermal plate in thermal communication with the third metallic layer of the diffusion-bonded block.

2. The calorimeter of claim 1 further comprising an insulation enclosure substantially surrounding the thermal shield.

3. The calorimeter of claim 1 wherein at least one of the first, second and third metallic layers is a copper layer.

4. The calorimeter of claim 1 wherein at least one of the first, second and third metallic layers is a stainless steel layer.

5. The calorimeter of claim 1 wherein each of the first and second heat flux sensors is a Peltier module.

6. The calorimeter of claim 1 wherein the diffusion-bonded block comprises more than three metallic layers.

7. The calorimeter of claim 1 wherein the thermal column comprises an aluminum block.

8. The calorimeter of claim 1 wherein the thermal plate comprises an aluminum plate.

9. The calorimeter of claim 1 wherein the thermal shield is formed of copper.

10. The calorimeter of claim 1 further comprising at least one calibration heater disposed in a side of each of the sample container and the reference container.

11. The calorimeter of claim 1 wherein each of the sample container and the reference container includes a plurality of tabs, the calorimeter further comprising a plurality of springs each coupled at one end to one of the tabs of the sample container and at an opposite end to one of the tabs of the reference container.

12. A battery thermal measurement apparatus for calorimetric measurements of a battery comprising:

a thermal column having a first side, a second side and a base;

a sample container disposed on the first side and configured to receive a battery to be tested;

a reference container disposed on the second side;

a first heat flux sensor disposed on the first side between the thermal column and the sample container;

a second heat flux sensor disposed on the second side between the thermal column and the reference container;

a diffusion-bonded block comprising a first metallic layer having a first thermal conductivity, a second metallic layer having a second thermal conductivity and a third metallic layer having a third thermal conductivity, wherein the second metallic layer is between the first metallic layer and the third metallic layer, the second thermal conductivity being different from the first thermal conductivity and the third thermal conductivity, and the first metallic layer is in thermal communication with the base of the thermal column; and a thermal plate in thermal communication with the third metallic layer of the diffusion-bonded block.

13. The apparatus of claim 12 further comprising a thermal shield in thermal communication with the thermal column, the thermal shield separated from and substantially enclosing the sample container, reference container and thermal column.

14. The apparatus of claim 13 further comprising an insulation enclosure substantially surrounding the thermal shield.

15. The apparatus of claim 12 wherein each of the first and second heat flux sensors is a Peltier module.

16. The apparatus of claim 12 wherein the diffusion-bonded block comprises more than three metallic layers.

17. The apparatus of claim 12 further comprising at least one calibration heater disposed in a side of each of the sample container and the reference container.

18. The apparatus of claim 12 wherein each of the sample container and the reference container includes a plurality of tabs, the calorimeter further comprising a plurality of springs each coupled at one end to one of the tabs of the sample container and at an opposite end to one of the tabs of the reference container.

* * * * *